United States Patent [19]

Knofel et al.

[11] 4,147,724

[45] Apr. 3, 1979

[54] PROCESS FOR THE PREPARATION OF POLYAMINES

[75] Inventors: Hartmut Knöfel, Leverkusen; Günther Ellendt, Krefeld, both of Fed. Rep. of Germany

[73] Assignee: Bayer Aktiengesellschaft, Leverkusen Bayerwerk, Fed. Rep. of Germany

[21] Appl. No.: 751,625

[22] Filed: Dec. 17, 1976

[30] Foreign Application Priority Data

Dec. 19, 1975 [DE] Fed. Rep. of Germany ....... 2557501

[51] Int. Cl.$^2$ ............................................ C07C 85/145
[52] U.S. Cl. ..................... 260/570 D; 260/453 AM; 560/19
[58] Field of Search .............. 260/570 D, 471; 560/19

[56] References Cited

U.S. PATENT DOCUMENTS

| | | | |
|---|---|---|---|
| 3,478,099 | 11/1969 | Ross et al. ............................ | 260/570 |
| 3,857,890 | 12/1974 | Recchia et al. ...................... | 260/570 |
| 3,952,042 | 4/1976 | Knofel .................................. | 260/570 |

FOREIGN PATENT DOCUMENTS 1127347 9/1968 United Kingdom ..................... 260/570

*Primary Examiner*—Robert V. Hines

*Attorney, Agent, or Firm*—Gene Harsh; Joseph C. Gil; R. Brent Olson

[57] ABSTRACT

This invention relates to a new and improved process for the preparation of polyamines based on diphenylmethane by acid condensation of aromatic amines with formaldehyde followed by processing of the condensation mixture. Compared with similar processes known in the art, the process according to the invention combines the advantage of requiring less distillation for processing the reaction mixture with the advantage of a wide scope for variation of the composition of the product finally obtained, particularly with regard to its concentration of 2,4'-isomers and greatly reduced concentration of 2,2'-isomers. More particularly, the instant invention is directed to a process for the preparation of multinuclear aromatic polyamines by condensation of aromatic amines with formaldehyde in the presence of aqueous acid catalysts in a condensation reaction carried out in at least two stages, followed by neutralization of the catalyst and recovery of aromatic polyamines characterized in that free amine is removed from the condensation reaction mixture by means of a hydrophobic solvent after the first condensation stage and before the final condensation stage, and the amine thus removed is returned to the aqueous, catalyst-containing phase by returning the resulting amine-containing solvent phase to said aqueous phase before the first condensation stage.

5 Claims, 2 Drawing Figures

PROCESS FOR THE PREPARATION OF POLYAMINES

BACKGROUND OF THE INVENTION

Numerous processes are already known for the preparation of arylamine/formaldehyde condensates, particularly of aniline/formaldehyde condensates, by reaction in the presence of aqueous acid catalysts and processing of the condensation mixture by distillation after neutralization of the catalyst and separation of the resulting organic phase. Polyamines based on diphenylmethane which are obtainable by these processes are primarily used as starting materials for preparation of the corresponding polyisocyanates.

In polyurethane chemistry, it is not only those polyisocyanate mixtures based on diphenylmethane series which are distinguished by a high 4,4'-diisocyanatodiphenylmethane content and low o-isomer content that constitute particularly valuable starting materials. For many fields of application, particularly where differing reactivities of the isocyanate groups are desired, there is special interest in polyisocyanate mixtures of the diphenylmethane series which contain a high proportion of 2,4'-diisocyanatodiphenylmethane. The proportion of o-isomers in polyamine mixtures is primarily a function of the strength and concentration of the acid catalyst used. If the aniline/formaldehyde condensation reaction is carried out in at least two stages, a low degree of protonation (degree of protonation = percentage of total quantity of nitrogen atoms present as ammonium groups) before the final condensation stage leads to an increased proportion of o-isomers in the end product. One disadvantage of this, however, is that in the processes known in the art, the often desirable increase in the concentration of 2,4'-isomers in the end products is invariably accompanied by an undesirable increase in the concentration of 2,2'-isomers.

BRIEF DESCRIPTION OF THE DRAWINGS

The figures schematically illustrate two embodiments of the instant invention.

DESCRIPTION OF THE INVENTION

Figure 1:
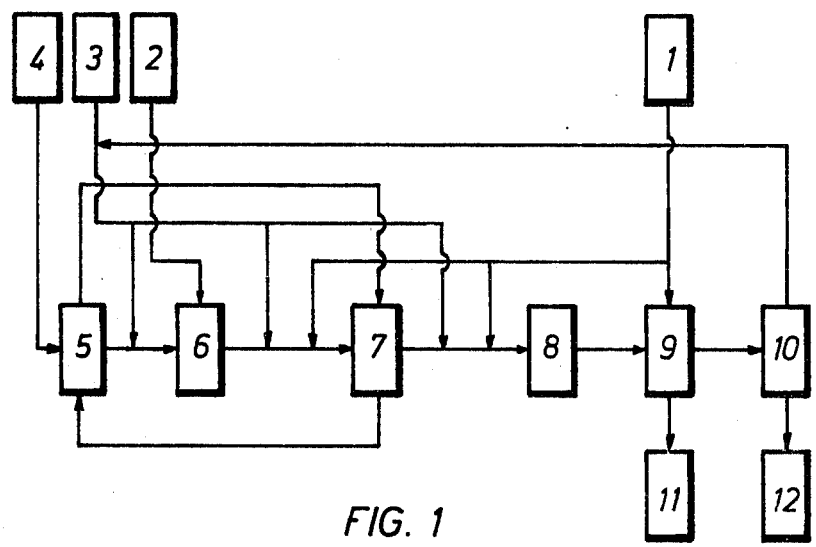

The present invention provides a new and improved process for arylamine/formaldehyde condensation in which the concentration of 2,4'-isomers in the end product and, in particular, the concentration of 2,4'-diaminodiphenylmethane, can be easily controlled and the end products are invariably distinguished by containing an exceptionally low proportion of 2,2'-isomers and, in particular, of 2,2'-diaminodiphenylmethane.

The present invention relates to a process for the preparation of multinuclear aromatic polyamines by condensation of aromatic amines with formaldehyde in the presence of aqueous acid catalysts by a condensation reaction carried out in at least two stages followed by neutralization of the catalyst and processing of the resulting reaction mixture, characterized in that free amine is removed from the reaction mixture by means of a hydrophobic solvent after the first condensation stage and before the final condensation stage, optionally after partial neutralization of the catalyst but before neutralization of the total quantity of catalyst put into the process, and the amine thus removed is returned to the aqueous, catalyst containing phase by mixing the resulting amine-containing solvent phase with said catalyst-containing phase before the first condensation stage.

Various possible embodiments of the process according to the invention will now be described in detail with reference to FIGS. 1 and 2 in which the reference numerals have the following meanings:

(1) A tank for alkalizing agent, preferably aqueous potassium or sodium hydroxide solution;
(2) a tank for aqueous formalin solution;
(3) a tank for arylamine used as starting material, preferably aniline;
(4) a tank for aqueous acid catalyst, preferably hydrochloric acid;
(5) an extractor (FIG. 1) or mixer (FIG. 2);
(6) the first condensation reactor;
(7) an extractor (FIG. 1) or phase separator (FIG. 2);
(8) the last condensation reactor;
(9) a neutralization stage;
(10) a distillation stage;
(11) a tank for effluent and
(12) a tank for end product.

Figure 2:
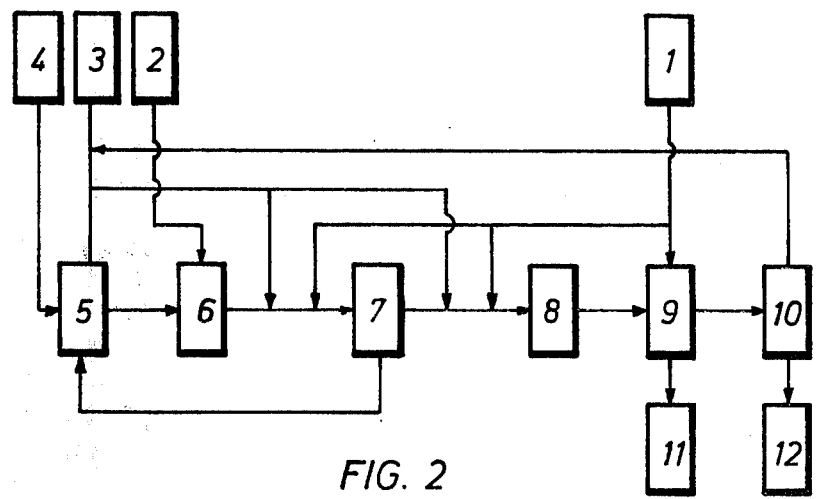

Except for the extractors and mixers/separators (5) and (7), the apparatus shown in FIGS. 1 and 2 are similar to the apparatus conventionally used for carrying out arylamine/formaldehyde condensation in the presence of aqueous acid catalysts in an at least two stage condensation reaction followed by neutralization and processing of the resulting organic phase by distillation. The characterizing feature of the present invention is that the known prior art condensation process carried out in at least two stages and outlined, for example in U.S. Pat. No. 3,476,806, has been modified in the process according to the invention to the effect that, before the aqueous condensation mixture enters the final condensation stage, free amine is removed from it at (7) by means of a hydrophobic solvent and returned to the aqueous phase at (5).

In a first embodiment of the process according to the invention (see FIG. 1), the reference numeral (7) in FIG. 1 represents an extractor in which free amine is removed from the aqueous system by means of a hydrophobic solvent before the system enters its final condensation stage (8), optionally after partial neutralization of the catalyst. The resulting solvent phase now containing amine is extracted with aqueous catalyst from tank (4) in another extractor (5) arranged in front of the first condensation stage.

The solvent leaving extractor (5) is returned to extractor (7). The following advantages are obtained by operating according to this first embodiment of the process of the invention:

(1) Extraction of unreacted starting arylamine before the last condensation stage (molecular rearrangement stage) reduces the amount of distillation required in distillation stage (10) since unreacted arylamine is returned to the beginning of the process without undergoing distillation.
(2) Extractor (7) preferentially removes N-(2-aminobenzyl)-aniline from the aqueous system in addition to free arylamine. Since unwanted 2,2'-diaminodiphenylmethane can only be formed via the intermediate stage of o-amino-benzylaniline and, moreover, the quantity of o-aminobenzylaniline extracted at (7) under otherwise constant conditions of extraction can easily be controlled by the degree of protonation at the entry into extractor (7) (o-aminobenzylaniline returned to the process reacts preferentially with more formaldehyde to form higher nuclear addition and condensation products), the process according to the invention provides a simple means of reducing the amount of 2,2'-diaminodiphenylmethane in the end products.

The advantages afforded by the first embodiment of the process according to the invention are also obtained when operating according to the second embodiment (see FIG. 2). The second embodiment of the process according to the invention differs from the first embodiment solely by the fact that a mixer (5)/separator or extractor (7) combination is used instead of the extractors (5) and (7) used in the first embodiment. This means that in the second embodiment the amine-containing solvent which is mixed at (5) with aqueous hydrochloric acid from tank (4) remains as a second phase in the reaction mixture passing through the first condensation reactor (6). The two phases are again separated in phase separator (7), optionally after partial neutralization of the catalyst.

According to a particular variation of the process of the invention, the aqueous phase leaving the extractor or separator (7) is subjected to further partial neutralization with alkalizing agent from tank (1) in order to reduce further the degree of protonation of the reaction mixture before its entry into the final condensation stage (rearrangement stage). The effect of this measure is to increase the proportion of 2,4'-diaminodiphenylmethane, formed by rearrangement of N-(4-aminobenzyl)-aniline, in the end product.

Any aromatic amines may be used in the process according to the invention, for example aniline; o-toluidine; m-toluidine; N-methylaniline; N-ethylaniline; 2,6-dimethylaniline; 2,6-diethylaniline; 2,6-diisopropylaniline and 2,4-diaminotoluene and any mixtures of such amines. Suitable arylamines also include, for example, anthranilic acid alkyl esters having from 1 to 4 carbon atoms in the alkyl group. The preferred arylamine for the process according to the invention is aniline, and the term "aniline" will be used hereinafter to represent any of the amines mentioned above.

The acids used in the process according to the invention are in particular water-soluble acids having a pKA value below 2.5 and preferably below 1.5. Examples of such acids include hydrochloric acid; phosphoric acid; sulphuric acid; methanesulphonic acid; trifluoromethane sulphonic acid and hydrobromic acid. The catalyst used is preferably hydrochloric acid. The acids mentioned above may also be used as mixtures with acid or neutral salts of such acids, for example the corresponding ammonium salts or corresponding alkali metal salts.

The hydrophobic solvents used for the process according to the invention may be any solvents boiling within a range of about 30° to 250° C. and preferably 80° to 200° C. which are immiscible with water and inert towards the reactants. Examples of particularly suitable solvents include chlorobenzene; dichlorobenzenes; benzene, toluene, xylenes; dichloroethane, chloroform, carbon tetrachloride, etc. The preferred solvent is o-xylene. The solvents are used for extraction in a ratio by volume of acid condensing agent to solvent of between 10:1 and 1:10 and preferably between 2:1 and 1:3.

The formaldehyde used as starting material in addition to aromatic amine in the process according to the invention is preferably in the form of an aqueous formalin solution.

The alkalizing agents used may be any basic compounds but potassium or sodium hydroxide solution is preferably used.

At the beginning of the condensation reaction (entry into reactor (6)), the molar ratio of aniline to formaldehyde is generally between 1:1 and 20:1 and preferably between 2:1 and 5:1. If desired, this ratio may be increased between reactors (6) and (8) by further addition of aniline from tank (3).

The volumetric ratio of (aniline +formaldehyde):-(water) at the beginning of the condensation reaction is generally between 2:1 and 25:1. This ratio is not essential for carrying out the process according to the invention.

In the process according to the invention, the degree of protonation at entry into the first condensation stage (6) is generally between 10 and 100%, preferably between 70 and 100%. In embodiments 1 and 2, the degree of protonation may, if desired, be lowered between the individual condensation stages (6) and (8) by further addition of the arylamine used as starting material from tank (3) or by the addition of alkalizing agent from tank (1). In both embodiments of the process, the degree of protonation at entry into the last reactor (8) is generally between 10 and 100%, preferably between 20 and 60%.

The degree of protonation at entry into the extractor or phase separator (7) is very important in the process according to the invention since the nature and quantity of free amine returned to (5) depends primarily on this degree of protonation. It is generally between 40 and 90% at entry into stage (7) and may be adjusted if necessary by addition of alkalizing agent from tank (1).

The solvent leaving extractor (5) in the first embodiment generally has a free amine content of not more than 60% by weight and preferably 10 to 30% by weight.

The process according to the invention is preferably carried out as a two-stage rearrangement reaction (reactors (6) and (8)). The formation of singly N-substituted intermediate products generally takes place in reactor (6), and the rearrangement of these intermediate products to form the desired end product in reactor (7).

The following temperatures are preferably employed in the process according to the invention:

The temperature in the extractor or mixer (5) is generally kept at 0° to 60° C., preferably 20° to 40° C.

The temperature in reactor (6) is generally kept at 0° to 60° C., preferably 20° to 40° C.

The temperature in extractor or separator (7) is generally 20° to 100° C., preferably 30° to 60° C.

The temperature in reactor (8) is generally 60° to 110° C., preferably 80° to 100° C.

In the process according to the invention, the aqueous phase leaving the final condensation stage (rearrangement stage) (8) is also treated in known manner by neutralization of the catalyst followed by phase separation in (9) into effluent discharged into the effluent tank (11) and organic phase transferred to distillation stage (10) where the organic phase is separated in known manner into unreacted arylamine originally put into the process and end product which is stored in tank (12).

The nature of the apparatus used in the process according to the invention is not material to the invention. For example any of the known tube extractors and liquid extractors, mixers and phase separators conventionally employed in chemical processes may be used.

The process according to the invention may, of course, also be carried out quite independently of the apparatus which have merely been illustrated by way of example in the drawings. In particular, any steps of the process (precondensation, rearrangement reaction, mixing, phase separation or extraction) may be carried out as single stage or multistage operations.

EXAMPLES

Example 1 (FIG. 1)

In a continuously operating experimental laboratory plant, stream (A) consisting of dilute hydrochloric acid from (4) is mixed with stream (C) from (7) in the cooled mixer of an extractor (5) designed as a mixer-separator unit. The resulting mixture is separated into an organic phase and an aqueous phase in the following separator.

Stream (A) (in g/h):
437 hydrogen chloride
1850 water

Stream (C) (in g/h):
5580 o-xylene
1120 aniline and polyarylamines.

The aqueous phase from (5) enters the reactor (6) consisting of three stirrer vessels, in which it is reacted at 35° to 40° C. with stream (B) consisting of 30% aqueous formalin solution.

Stream (B) (g/h):
75 formaldehyde
175 water 1150 g/h of aniline are added to the condensation solution leaving reactor (6) before the solution enters the multi-stage extraction column (7) where it is extracted at 40° to 50° C. by means of the xylene phase separated at (5), which has been depleted of amine. The extract is returned to the mixer of (5) as stream (C).

850 g/h of aniline are added to the aqueous phase leaving (7) and the reaction is completed at boiling temperature in a second reactor (8) also consisting of three stirrer vessels to produce the end product.

Subsequent treatment of the aqueous phase from (8) by neutralization in (9) with excess aqueous sodium hydroxide solution from (1), removal of the sodium chloride solution and separation of the resulting organic phase from (9) into aniline and condensation product by distillation in stage (10) are carried out in the usual manner.

The product obtained by the procedure described above and collected in (12) (about 480 g/h) is distinguished by its low 2,2'-isomer content (less than 0.1% by weight). Its average diaminodiphenylmethane content is 92 to 93% by weight, 2 to 3% by weight of which consists of the 2,4'-isomer.

Example 2 (FIG. 2)

In a continuously operating experimental laboratory plant, stream (A) consisting of dilute hydrochloric acid from (4) and stream (C) obtained from (7) are mixed in a cooled mixer (5).

Stream (A) (g/h):
437 hydrogen chloride
1850 water

Stream (C) (g/h):
5880 o-xylene
1120 aniline and polyarylamine.

The diphasic mixture from mixer (5) enters the first reactor (6) consisting of three stirrer vessels, in which stream (B) consisting of a 30% formalin solution is introduced and the temperature is kept at 35° to 40° C. during the reaction.

Stream (B) (g/h):
75 formaldehyde
175 water 1560 g/h of aniline are added to the reaction mixture leaving reactor (6) before the amine-containing xylene phase is separated from the mixture in the following separator (7) at 50° to 60° C. and returned to (5) as stream (C).

670 g/h of aniline and 360 g/h of sodium hydroxide in the form of an aqueous solution are added successively to the aqueous phase leaving (7). The resulting mixture is then reacted at boiling point to form the end product in a second reactor (8) also consisting of three stirrer vessels.

Subsequent processing of the aqueous phase from (8) by neutralization (9) with excess aqueous sodium hydroxide solution from (1), removal of the sodium chloride solution and separation of the organic phase from (9) into aniline and end product by distillation in distillation stage (10) is carried out in the usual manner.

The end product obtained from the above described example of the process according to the invention and collected at (12) (about 480 g/h) is distinguished by its relatively high 2,4'-diaminodiphenylmethane content combined with a very low 2,2'-diaminodiphenylmethane content (less than 0.1%). The average diaminodiphenyl content is 88 to 90%, about 10% of which consists of the 2,4'-isomer.

What is claimed is:

1. A process for the preparation of multinuclear aromatic polyamines by condensation of aromatic amines with formaldehyde in the presence of aqueous acid catalysts in a condensation reaction carried out in at least two stages, followed by neutralization of the catalyst and recovery of aromatic polyamines, characterized in that free amine is removed from the condensation reaction mixture by means of a hydrophobic solvent after the first condensation stage and before the final condensation stage, and the amine thus removed is returned to the aqueous, catalyst-containing phase by returning the resulting amine-containing solvent phase to said aqueous phase before the first condensation stage.

2. The process of claim 1, wherein said free amine is removed after partial neutralization of the catalyst.

3. The process of claim 1, characterized in that the acid catalyst in the reaction mixture is partially neutralized by addition of a basic compound after treatment of the reaction mixture with hydrophobic solvent but before entry of the reaction mixture into the final condensation stage.

4. The process of claim 1 characterized in that return of the solvent phase which contains amine to the aqueous phase containing catalyst is carried out in a mixer to form a diphasic mixture which after leaving the first condensation stage but before entering the final condensation stage is separated in a phase separator into an aqueous phase and the aforesaid solvent phase.

5. The process according to claim 1 characterized in that the condensation reaction is carried out in the absence of hydrophobic solvent in all stages, both removal of free amine from the aqueous phase and return of the resulting amine-containing solvent phase to the aqueous phase being carried out by means of a solvent in a separate cycle, using extractors.

* * * * *